United States Patent Office 3,188,463
Patented June 8, 1965

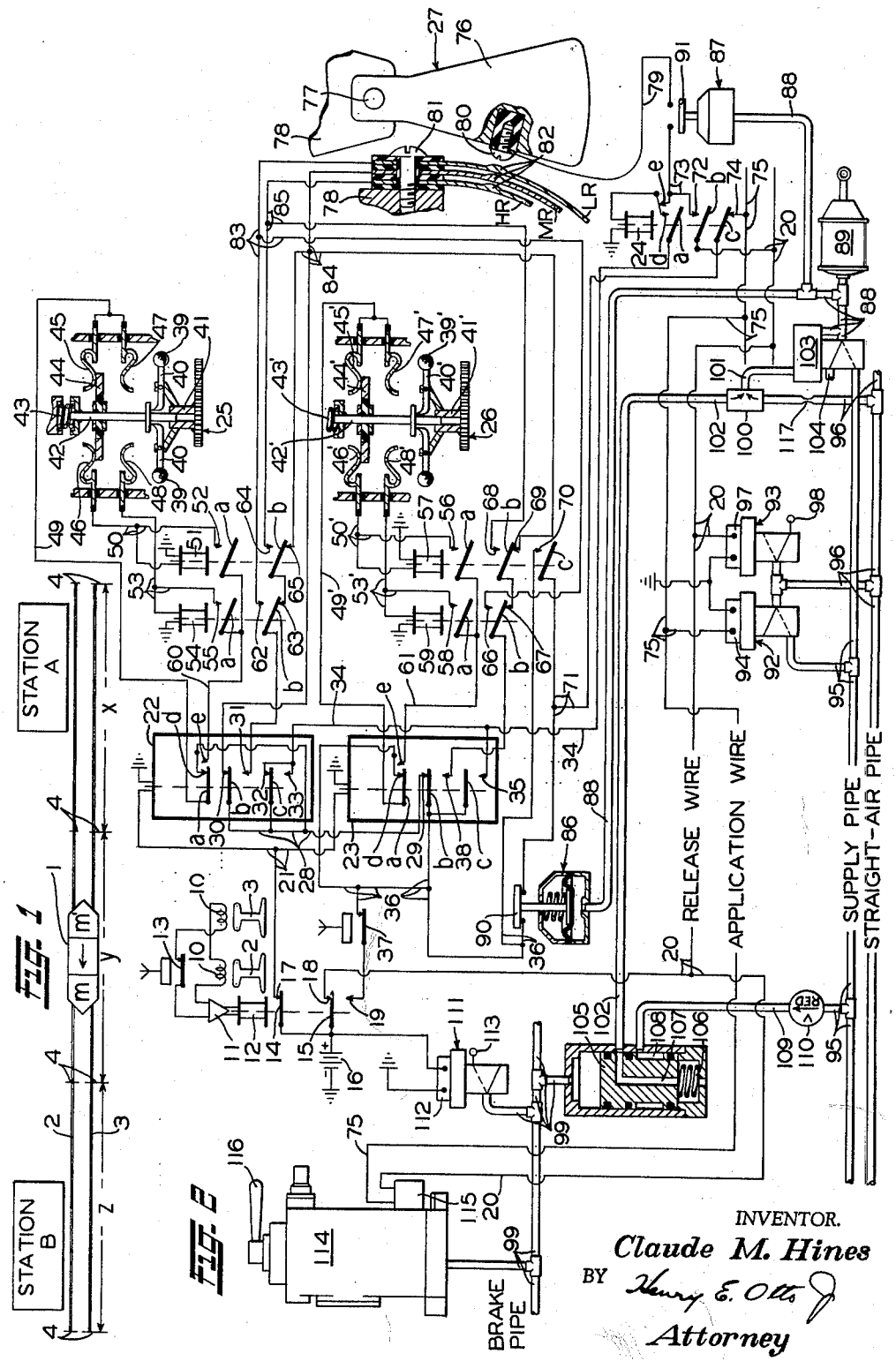

3,188,463
BRAKE CONTROL APPARATUS FOR UNMANNED TRAINS
Claude M. Hines, Verona, Pa., assignor to Westinghouse Air Brake Company, Wilmerding, Pa., a corporation of Pennsylvania
Filed Apr. 25, 1960, Ser. No. 24,446
17 Claims. (Cl. 246—182)

This invention relates to brake control apparatus for unmanned trains, the terms "unmanned trains" being used to connote passenger and freight trains on which no engineman or other operating personnel need be provided and which are adapted to be controlled by signals from the wayside or by coded current conditions in electrically isolated track sections.

Currently there is interest in providing unmanned trains in metropolitan subway shuttle service between two stations. The brake control apparatus and propulsion control apparatus on such trains must necessarily be controlled responsively to signals from the wayside or coded current conditions in track circuits. The brake control apparatus on such trains must also embody means for so controlling the rate of deceleration of the train as it approaches a station that the train, irrespective of its approach speed and weight, will be brought automatically and reliably to a stop at a substantially fixed point within the station each time a brake application is initiated by the wayside signal or coded current condition in a track circuit.

Railway traffic control apparatus responsive to coded track currents has heretofore been provided to effect an application of train brakes automatically if the train enters a track section occupied by another train, unless the operator within a predetermined time interval manually initiates an application of brakes to slow down or stop the train; however, no provision is made in such apparatus for releasing as well as applying train brakes in order that the train will always stop at substantially a fixed point after it enters such track section. On the other hand, retardation controllers responsive to the rate of deceleration of the train have been provided in certain passenger train brake control equipments to regulate the radiation of the train due to braking to a rate insufficient to cause sliding of the wheels during a manually initiated brake application. The traffic control apparatus and retardation controllers heretofore proposed, however, are insufficient in and of themselves to provide the type of brake control necessary for unmanned trains.

The principal object of this invention is therefore to provide a novel integrated brake control apparatus embodying means operative not only to control application and release of train brakes automatically, without intervention of an operator on the train, responsively to the coded current conditions provided in the rails of electrically isolated track sections (or if preferred responsively to a wayside radio signal) but also so control the rate of retardation of the train that it will always stop smoothly at substantially the same point within a station or other terminal after the train, irrespective of its weight and velocity, enters a track section leading to such station or terminal.

According to this object, there is provided, for an unmanned train, a brake control apparatus set into operation by a change in coded current condition in a track circuit and embodying means for checking train speed periodically after initiation of the brake application and conditioned at the expiry of each such period to cause an increase, retention or decrease in the degree of brake application during the next successive period according to whether at the instant the particular period expires train speed exceeds, is substantially at or is less than a preselected value at which it should ideally be at the expiry of that particular period, whereby the train will be smoothly and reliably brought to a stop at a substantially fixed point within a station or terminal.

Other objects and advantages will become apparent from the following more detailed description of the invention and from the accompanying drawings, wherein:
FIG. 1 is a diagrammatic view of track rails divided into electrically isolated insulated track sections through which an unmanned train is movable in either direction between stations; and FIG. 2 is a diagrammatic view of a brake control apparatus which is provided on the motor unit of the train and embodies the invention and is controlled by coded current condition in said track sections.

*Description*

As shown in FIG. 1, a train 1 is movable in either direction between stations A and B along track rails 2, 3 divided by insulated joints 4 into electrically isolated track sections X, Y, Z. The train 1 may be of the articulated type having motor units M, M' at its respective ends and each of which is conditioned to serve as the effective motor unit only when it is at the head end of the train. While the effective motor unit M or M' is within the intermediate track section Y, the latter is always supplied with alternating (or if preferred, direct) current coded to be interrupted at a selected rate, of say 180 times per minute. On the other hand, the end sections X and Z are selectively supplied with such coded alternating (or direct) current only when it is desired to condition the train 1 to move from stations A and B, respectively, toward intermediate section Y; and no current, coded or otherwise, is supplied to the track sections X, Z when the train is to move into these sections from intermediate section Y.

The track circuits for controlling the presence and absence of coded current in the rails 2, 3 of the respective track sections forms no part of my invention. However, it may be noted that if coded alternating current is desired, track circuits may be employed for each track section which are generally similar to that disclosed in U.S. Patent 2,293,307, except that energization of the patentee's relay "HD" would be remotely controlled, such as by a human or electronic dispatcher (rather than by traffic condition), thereby eliminating the need for the transformer rectifier "ER" and code following relay "ETR"; and the elements "8," "75a," "75" would be eliminated to selectively provide current at the 180 code rate or no current according to whether relay "HD" is energized or deenergized, respectively. Hence, alternating current at the 180 code rate will be supplied to the patentee's primary winding "6" of transformer "TD" for supply to the track sections via secondary winding "2," only if relay "HD" is energized by the dispatcher while the effective motor unit is within such section, in accordance with the usual practice. On the other hand, U.S. Patent 2,312,050 shows a track circuit which may be modified in somewhat similar manner to provide direct current at the 180 code rate or no cururent in a track section according to whether a relay "HD" is energized or deenergized under control of a dispatcher.

According to the invention, and as shown in FIG. 2, there is provided on each motor unit M, M' a pair of inductors 10, 10 connected serially and in inductive relation to the rails 2, 3 so that when coded current is flowing through the rails of the particular track section over which the inductors are then disposed, electrical energy will be supplied to an amplifier 11 and energize a relay 12 provided a radio-controlled switch 13 is closed.

Relay 12 has two movable contact arms 14, 15 which are connected to the positive terminal of an energy source, such as a battery 16. When relay 12 is energized, as shown, its front contacts 17, 18 will be energized and a back contact 19 will be deenergized.

Contact 18 is connected to a branch of a release train wire 20 that extends from each motor unit M, M' through the intervening cars of the train. Contact 17 is electrically connected by branches of a wire 21 to the positive terminals of suitable timing means, such as time delay relays 22, 23, of the dash-pot type which are adapted to drop out a preselected time interval (such as about 20 seconds) and a preselected greater time interval (such as about 30 seconds), respectively, after the instant contact 17 becomes deenergized. Under ideal conditions, train speed will have reduced to a preselected speed, such as ten miles per hour, and to a preselected lower speed, such as five miles per hour, at the ends of the said preselected time interval and greater time interval, respectively. If it has not, other apparatus including a quick release relay 24, speed-controlled switch devices 25, 26 and a retardation controller 27 will operate to correct the retardation rate of the train, in the manner presently to be described.

Relays 22, 23, 24 each have three movable contact arms a, b, c, respectively. These relays 22, 23, 24 have "continuity transfer type" contacts d, e, respectively, each contact d being spring-biased toward engagement with corresponding contact e and disengageable from contact e by the corresponding arm a upon energization of the particular relay. Upon deenergization of the respective relays 22, 23, 24 their corresponding arms a will not disengage the corresponding contacts d until after the contacts d have engaged the corresponding contacts e, for reasons which will hereinafter become apparent. It is to be understood that contacts 17, 18, 19 and all other contacts hereinafter to be described (and denoted by reference numerals rather than letters) are of the conventional type; i.e., front contacts will be disengaged by the controlling movable contact arms prior to engagement of the corresponding back contacts, and vice versa.

In relay 22, arms b, c are connected to a wire 28, having branches leading to front contact d of relay 22 and to a front contact 29 of relay 23. Arm b of relay 22 selectively engages a front contact 30 or a back contact 31. Arm c of relay 22 selectively engages a front contact 32 or a back contact 33, both of which contacts are connected to branches of a wire 34 connected to arm a of relay 24 and to a back contact 35 of relay 23, whereby supply of energizing current from wire 28 to said arm a will be temporarily interrupted during drop out of relay 22, for reasons hereinafter to be explained.

In relay 23, arms b, c are connected to a wire 36 having one branch leading to contact d of said relay and another branch which is connected to back contact 19 of relay 12 provided a radio-controlled switch 37 is closed, said switch responding to the same frequency as switch 13 and like the latter being closed to select which of the motor units M or M' is to be the effective motor unit for controlling brakes on the train. If only one motor unit is to be used continually, these switches 13, 37 are unnecessary and the connections they establish when closed will be made permanent. Arm b of relay 23 selectively engages front contact 29 or a back contact 38, and arm c of said relay controls only the back contact 35.

Device 25 may comprise flyballs 39 carried at the outer ends of arms 40 which intermediate their ends are pivotally connected to inclined struts secured to a sleeve 41 which is rotatably driven by suitable gearing at a speed proportional to the rotative speed of such as a driving axle (not shown) of the motor unit and hence proportional to the linear speed of said motor unit and hence of train 1 along the rails 2, 3. At their inner ends the arms 40 contact a collar on a shaft 42 which is biased downwardly by a speeder spring 43. A disc-shaped switch 44 is mounted in a fixed axial position on shaft 42 and is electrically insulated therefrom. Thus, as train speed increases and causes a corresponding increase in centrifugal force of the flyballs 39, the arms acting through the collar on shaft 42 will move the latter progressively upward against resistance of spring 43 and thereby vary the position of the switch 44 according to train speed.

Spring 43 is of such value that the switch 44 will connect two yieldable contacts 45, 46, as shown, when train speed is at least eleven miles per hour; will connect two other yieldable contacts 47, 48 when train speed is nine miles per hour or less; and will be disposed between and disengaged from both sets of axially spaced yieldable contacts when the train is at substantially said preselected speed of ten miles per hour. Contacts 45, 47 are connected by a wire 49 to arm a of relay 22. Contact 46 is connected by a wire 50 to the positive terminal of a relay 51 and to a front contact 52 of said relay, and contact 48 is connected by a wire 53 to the positive terminal of a relay 54 and to a front contact 55 of relay 54, so that said relays will be energized selectively only if wire 49 is energized at a time when switch 44 connects the corresponding sets of contacts.

Except as hereinafter noted, the switch device 26 may be identical in structure and operation with device 25; and hence in the drawing like reference numerals have been used, but primed, to denote corresponding parts. The only difference between the two devices 25, 26 is that the speeder spring 43 is stronger than the spring 43'. Spring 43' is of such value that switch 44' will connect the yieldable contacts 45', 46', as shown, when train speed is at least six miles per hour; will connect yieldable contacts 47', 48' when train speed is four miles per hour or less; and will be disposed between and disengaged from both sets of axially spaced contacts when the train is at substantially said preselected lower speed of five miles per hour.

Wire 50' leads to the positive terminal and a front contact 56 of a relay 57, and wire 53' leads to the positive terminal and a front contact 58 of a relay 59, so that said relays can be selectively energized only if wire 49' is energized. Wire 49' is connected to arm a of relay 23.

Relays 51, 54, 57, 59 each have two movable contact arms, a, b, and the relay 57 has a third movable contact arm c. Arms a of relays 51, 54, 57, 59 can engage front contacts 52, 55, 56, 58, respectively. Arms a of relays 51, 54 are connected by a wire 60 to contact e of relay 22; and arms a of relays 57, 59 are connected by a wire 61 to contact e of relay 23. Arm b of relay 54 is connected to front contact 31 of relay 22 and can engage a front contact 62 or a back contact 63. Back contact 63 is connected to arm b of relay 51 which arm can engage a front contact 64 or a back contact 65. Arm b of relay 59 is connected to back contact 38 of relay 23 and can engage a front contact 66 or a back contact 67. Arm b of relay 57 is connected to front contact 67 and can engage a front contact 68 or a back contact 69. Arm c of relay 57 can engage a front contact 70 connected to a branch of wire 36, said arm being connected by a wire 71 to arm c of relay 24.

In relay 24, arm *b* can engage a front contact 72 connected to contact *e* of said relay by a wire 73; and arm *c* can engage a back contact 74 connected to a branch of an application train wire 75 that extends through the train.

Retardation controller 27 may comprise a heavy pendulum 76 rockably supported on a pin 77 carried by a fixed member 78 on the particular motor unit. A wire 79 is connected to a screw 80 which is carried in the side of the pendulum and suitably insulated therefrom. As the train is braked during leftward movement as viewed in the drawing, the pendulum 76 will swing clockwise about pin 77 a degree corresponding to the rate of deceleration or retardation of the train, so that as retardation rate increases, screw 80 will electrically connect the wire 79 successively to a low rate contact LR, then additionally to a medium rate contact MR, and then additionally to a high rate contact HR. These contacts LR, MR, and HR may be in the form of yieldable leaf springs secured adjacent their respective one ends to fixed member 78 by a screw 81, and insulated from said screw and fixed member and from each other such as by intervening insulating sheaths or spacers and a screw-encircling insulating sleeve. Because of the thickness of the spacers it may be desirable to provide contact beads 82 on these contacts substantially in the arcuate path of travel of the head of screw 80 to facilitate their electrical connection to each other as the screw swings clockwise.

The clamped upper ends of contacts LR, MR and HR are connected to wires 83, 84, 85, respectively. Wire 83 leads to front contacts 62, 66 of relays 54, 59, respectively. Wire 84 leads to front contact 30 of relay 22, to back contact 65 of relay 51, and to back contact 69 of relay 57. Wire 85 leads to front contacts 64, 68 of relays 51, 57, respectively.

Two pneumatically controlled switch devices 86, 87 (the latter not shown in detail) are provided which are connected to branches of a pipe 88 leading to a brake cylinder 89. When brake cylinder pressure is less than a certain value, such as about 40 p.s.i., corresponding to a predetermined minimum rate of retardation of the train, a switch 90 of device 86 will be spring-biased to a closed position to connect branches of wires 36, 71 in bypass of arm *c* of relay 57; hence, wire 71 will be deenergized when switch 90 opens unless relay 57 is energized and relay 12 is deenergized. When brake cylinder pressure is less than a chosen value, such as about 30 p.s.i., a switch, 91 of device 87 will be spring-biased to open position and hence prevent supply of current to wire 73 from wire 79 to prevent complete release of train brakes, as presently to be described.

The apparatus also comprises an application magnet valve device 92 and a release magnet valve device 93. Device 92 comprises a magnet 94 connected to application wire 75 and valve means (not shown) responsive to energization of said magnet to supply pressure fluid from a supply pipe 95 to a straight air pipe 96 and responsive to deenergization of said magnet and wire to cut off such supply. Device 93 comprises a magnet 97 connected to release wire 20 and valve means (not shown) responsive to energization of said magnet to connect pipe 96 to a vent port 98 and responsive to deenergization of said magnet to cut off said pipe from said vent port.

The supply pipe 95, straight air pipe 96, and a brake pipe 99, as well as release wire 20 and application wire 75, extend from unit to unit through the train.

A double check valve 100 operates to connect a pipe 101 to the straight air pipe 96 or to an emergency pipe 102 according to which of the pipes 96 or 102 is charged to the higher pressure. A brake cylinder relay valve 103 is preferably provided which is subject opposingly to pressures of fluid in pipe 101 and in brake cylinder pipe 88 and operates to connect pipe 88 to supply pipe 95 or to a vent pipe 104 as necessary to provide in the brake cylinder fluid at a pressure corresponding to that provided in pipe 101; however, if this relay valve is not desired, pipe 88 can be connected directly to pipe 101. An emergency application valve 105 is subject opposingly to brake pipe pressure and to pressure of a bias spring 106 and operates to connect pipe 102 to a vent passageway 107 so long as brake pipe pressure exceeds a chosen value such as about 35 p.s.i. However, if brake pipe pressure should, such as due to pull-apart, drop below 35 p.s.i., valve 105 will be spring-biased to an emergency position, in which a valve cavity 108 connects pipe 102 to a pipe 109 connected via a reducing valve 110 to supply pipe 95, for causing pipe 102 and hence pipes 101 and 88 to be charged to a value corresponding to the setting of said reducing valve to effect an emergency application of brakes.

A safety valve device 111 is preferably provided which comprises a magnet 112 normally energized from source 16 to cause valve means (not shown) to cut off a branch of brake pipe 99 from a vent port 113 and deenergized upon failure of said source to vent the brake pipe via port 113 to cause emergency application valve 105 to operate, as just described, to effect an emergency application of brakes.

An operator's brake valve device 114 of the type fully disclosed in FIG. 1 of U.S. Patent 2,591,224 may, if desired, also be provided to permit brakes on the train to be controlled manually by an operator if such should become desirable or necessary. Insofar as the present invention is concerned, it need merely be noted that branches of the application wire 75 and release wire 20 are connected to a master switch 115 provided within the device 114, and that during manual control of electro-pneumatic brakes by operator-controlled movement of a brake valve handle 116, the radio-controlled switches 13 and 37 will be opened to render the track-circuit controlled brake control system inoperative. This brake valve device 114 also comprises means (not shown) responsive to movement of brake valve handle 116 to an emergency position to vent the brake pipe 99. For detailed structure of the devices 92, 93, 103, 114, 115 the reader is referred to the corresponding devices identified by the reference numerals "40," "41," "39," "23," and "283," respectively, of U.S. Patent 2,591,224. Also, the emergency application valve 105, instead of being responsive to degree of reduction in brake pipe pressure, may, if preferred, respond to an emergency rate of reduction in brake pipe pressure and be of the type designated as "44" in said patent.

In any event, it is to be understood that each unit of the train includes brake equipment comprising magnet valve devices (like 92, 93) controlled by energization and deenergization of the application wire 75 and release wire 20, and brake cylinder relay valves (like 103) to control brakes on such unit electro-pneumatically as well as an emergency application valve like 105 (or "44" of Patent 2,591,224) to effect an automatic emergency application of brakes responsively to venting of the brake pipe 99.

*Operation*

The various components of the system have been fully described above because, in subsequent description of operation, only those connections which are of importance under a particular condition will be discussed.

Assume initially that the train 1 is in intermediate track section Y and is moving leftward toward station B at a speed in excess of 11 miles per hour; that the brake pipe 99 is charged with pressure fluid; that the battery 16 is in proper working order and supplying energy to magnet 112 of safety device 111; that the radio-controlled switches 13, 37 on the then effective motor unit M are closed, and that the corresponding switches 13, 37 on the ineffective motor unit M' are opened; and that, if brake valve devices 114 are provided on the motor units M, M', the brake valve handles 116 are in a handle-off position to render these devices 114 ineffective to control brake pipe pressure or energization of the application wire 75 and release wire 20.

Under these assumed conditions, the various components of the brake system on effective motor unit M will be in the respective positions in which they are shown in FIG. 2, for reasons now briefly to be explained.

On the effective motor unit M, the inductors 10 will pick up current at the 180 code rate from the rails 2, 3 within the track section Y and, since switch 13 is closed, cause amplifier 11 to supply an energizing voltage to relay 12. With relay 12 energized, current will flow from battery 16 via arm 15 and front contact 18 to release wire 20 for energizing magnet 97 of release magnet valve device 93 to cause the latter to vent straight air pipe 96. Since the brake pipe 99 is charged, pipe 102 will be vented via emergency application valve 105; and since the straight air pipe 96 is also vented, pipe 101 and hence the brake cylinder 89 will be maintained vented by brake cylinder relay valve 103, and thereby cause switch 90 of device 86 to be closed and switch 91 of device 87 opened, as shown.

It will be noted that application wire 75 and hence magnet 94 of device 92 will be deenergized because back contact 19 of relay 12 is deenergized.

Meanwhile, current will flow from battery 16 via arm 14 and front contact 17 of relay 12 to wire 21 for energizing time delay relays 22, 23. However, since back contact 19 of relay 12 and hence wires 36, 49 and 49' are deenergized, no current will be supplied to switches 44, 44' of devices 25, 26 and hence relays 51, 54, 57, 59 will all be deenergized. Quick release relay 24 will also be maintained deenergized because switch 91 is open.

Thus, the release wire 20 will be maintained energized and the application wire 75 deenergized via the circuits above traced for thereby operatively maintaining the brake cylinders on all units of the train vented, so long as relay 12 on effective motor unit M is maintained energized by coded current picked up by the inductors 10, 10 from the rails 2, 3 within track section Y, thereby permitting the train to proceed through said track section.

Assume now that the inductors 10, 10 of motor unit M pass across the insulated joints 4 and into end track section Z. As already explained, no coded current will be provided in this end section Z when the train moves leftward into said section from section Y; and hence as soon as the inductors 10, 10 pass into end section Z, supply of energizing voltage to relay 12 will be terminated.

The consequent deenergization of relay 12 will cause arm 15 promptly to drop and thus cut off supply of current from battery 16 via front contact 18 to release wire 20, for deenergizing magnet 97 to cause release magnet valve device 93 to cut off the straight air pipe 96 from vent port 98. Meanwhile, current will start to flow from battery 16 to the application wire 75 via arm 15 and back contact 19 of relay 12, switch 37, wire 36, initially closed switch 90, wire 71 and arm c and back contact 74 of quick release relay 24 for energizing magnet 94 of device 92. This, in turn, will cause device 92 to supply pressure fluid from supply pipe 95 to straight air pipe 96 and preferably via a choke 117 and double check valve 100 to pipe 101 for causing fluid to be provided in the brake cylinder 89 at the pressure provided in pipe 101.

Meanwhile, upon deenergization of relay 12, arm 14 will drop for cutting off supply of energy from battery 16 to the time delay relays 22, 23 to cause the latter to drop out sequentially a preselected time interval and a preselected greater time interval respectively, after the instant relay 12 becomes deenergized. This will provide three time periods after relay 12 becomes deenergized and during which braking condition will be sensed, namely, the period before relay 22 drops out, the period between drop-out of relay 22 and up to drop-out of relay 23, and the period following drop-out of relay 23. Operation under varying conditions during these time periods will now be discussed.

*First period.—Before relay 22 drops out*

Throughout this first period, some of the current supplied to wire 36 via back contact 19 of relay 12 will flow via arm b and front contact 29 of relay 23 to wire 28. From wire 28, current will flow via arm c and front contact 32 of relay 22 to wire 34 and arm a of relay 24; current will flow via arm b and front contact 30 of relay 22 to wire 84 for energizing medium rate contact MR of retardation controller 27; and current will flow via contact d and arm a of relay 22 to wire 49 for energizing contacts 45, 47 of device 25. Also, throughout this period some current will flow from wire 36 via contact d and arm a of relay 23 to wire 49' for energizing contacts 45', 47' of device 26.

By virtue of propulsion controls not forming part of the present invention and controlled by coded current condition in the rails 2, 3, train speed will be at or near a certain value (such as about 32 miles per hour, and in any event considerably more than 11 miles per hour) at the instant motor unit M enters track section Z. Reference may be had to the copending application, Serial No. 68,081 of Leslie R. Allison, filed November 8, 1960, and assigned to the assignee of the present application for a detailed disclosure and description of such propulsion controls. In consequence of the control of the train speed, as exercised by such propulsion controls, switch 44 of device 25 will initially be in upper contact position, as shown, for energizing relay 51 via contact 46 and wire 50. Also, switch 44' of device 26 will remain in upper contact position, as shown, during this period for energizing relay 57 via contact 46' and wire 50'.

With relay 57 energized, current can flow via wire 36, front contact 70 and arm c to wire 71 and then via arm c and back contact 74 of relay 24 to the application wire 75 for maintaining the latter energized after switch 90 opens responsively to attainment of the illustrative brake cylinder pressure of 40 p.s.i. Meanwhile, when brake cylinder pressure exceeds the illustrative 30 p.s.i., switch 91 will be closed to connect wires 79, 73, but without consequence unless wire 79 is energized. Such energization will occur during this period if the retardation rate of the train is sufficient to cause screw 80 of device 27 to make effective electrical contact with bead 82 of medium rate contact MR (which is then energized via front contact 30 of relay 22, as above described); whereupon current will flow via wires 79, 73 and contacts e, d of release relay 24 to the positive terminal of relay 24 for energizing the latter. With relay 24 energized, arm c will disengage back contact 74 for cutting off supply of current from wire 71 to the application wire 75 and thus deenergizing application magnet valve device 92 to cut off supply of pressure fluid to the straight air pipe 96; and arm b of relay 24 will engage front contact 72 to supply current from wire 73 to release wire 20 to cause release magnet valve device 93 to operate to locally release pressure fluid from the straight air pipe and hence operatively from the brake cylinder 89. Straight air pipe pressure will be released until retardation rate of the train reduces sufficiently to cause screw 80 to swing counterclockwise out of effective contact with medium contact MR, and thus cut off supply of current to release wire 20. However, once energized, relay 24 will be maintained energized via the holding circuit including front contact 32 of relay 22, wire 34, and arm a and contact d of relay 24, thereby preventing reenergization of application wire 25, with the result that when screw 80 disengages contact MR, both wires 75, 20 will be deenergized for causing devices 92, 93 to bottle up fluid in the straight air pipe 96 and hence operatively in the brake cylinder 89.

During this first period, the position of switch 44 will be controlled according to train speed and thus preconditioned to reflect the train speed existing at the instant relay 22 drops out. However, since no current is supplied to back contact 31 of relay 22 during this first period, any change in position of switch 44 during this period will be without consequence.

*Second period.—After relay 22 drops out*

When relay 22 drops out, current will be supplied via wire 28 and continuity transfer contacts *d, e* to wire 60 before arm *a* disengages said contact *d* and thus cuts off supply of current to wire 49; arm *b* will disengage front contact 30 for cutting off supply of current from wire 28 to wire 84 and will engage back contact 31 for supplying current from wire 28 to arm *b* of relay 54; and arm *c* will, with a slight interruption, resupply current from wire 28 to wire 34 via back contact 33, said interruption being to cause deenergization of release relay 24 if it should have been energized via the holding circuit including wire 34 and its arm *a* and contact *d*, so that a new set of conditions will be brought into play to control energization of relay 24, as presently to be explained.

Meanwhile, at the instant relay 22 drops out, relay 51 will be energized via switch 44 and relay 54 deenergized if train speed then is at least 11 miles per hour; relay 54 will be energized via switch 44 and relay 51 deenergized if train speed is 9 miles per hour or less; and both of said relays will be deenergized if train speed is ideally between 11 and 9 miles per hour and causes switch 44 to be disengaged from both contacts 46 and 48.

If relay 51 is energized at the instant relay 22 drops out, it will be maintained energized during this second period because current will flow via continuity transfer contacts *d, e* of relay 22 to wire 60 (as above described) and thence via arm *a* and front contact 52 of relay 51 to the positive terminal of relay 51 via wire 50. With relay 51 energized and relays 22, 54 deenergized, current will flow via back contact 31 of relay 22, arm *b* and back contact 63 of relay 54, and arm *b* and front contact 64 of relay 51 to wire 85 for energizing high rate contact HR of controller 27. Thus, the release relay 24 will remain deenergized for maintaining application train wire 75 and hence application device 92 energized, so long as the retardation rate is not sufficient to cause effective electrical contact of screw 80 with contact HR, because a greater degree of braking is desired in order to reduce train speed before relay 23 drops out.

If, however, relay 51 is deenergized but relay 54 is energized at the instant relay 22 drops out, thus indicating that train speed is undesirably at or below 9 miles per hour, relay 54 will be maintained energized during and after drop out of relay 22 because current will flow via continuity transfer contacts *d, e* of relay 22, wire 60, and arm *a* and front contact 55 to the positive terminal of relay 54 via wire 53 before supply of current to wire 53 from wire 49 is cut off. With relay 54 energized, current will flow via back conact 31 of relay 22 and arm *b* and front contact 62 of relay 54 to wire 83 for energizing low rate contact LR of device 27. Thus, release relay 24 will be energized for deenergizing application wire 75 and energizing release wire 20 if the retardation rate is sufficient to cause screw 80 to contact the low rate contact LR.

If, on the other hand, relays 51, 54 are both deenergized at the instant relay 22 drops out, thus indicating that train speed is ideally between 11 and 9 miles per hour, both relays 51, 54 will remain deenergized because their holding circuits (including respective contacts 52, 55) will not be established. Hence, current will flow via back contacts 31, 63, 65 of relays 22, 54, 51, respectively, to wire 84 for energizing medium rate contact MR of device 27. Hence, release relay 24 will be energized only if retardation rate is sufficient to cause screw 80 to effectively contact medium rate contact MR.

If, during this period, release relay 24 is energized, it will be maintained energized via the holding circuit including back contact 33 of relay 22, wire 34, and arm *a* and contact *d* of relay 24. But once the retardation rate of the train is reduced enough to cause the screw 80 to effectively disengage the then energized contact HR, LR or MR (as the case may be, depending upon which of the three conditions just described prevailed at the instant relay 22 dropped out), the supply of current to release wire 20 will be cut off; and since relay 24 will remain energized, application wire 75 will remain deenergized, thereby causing pressure to be bottled up in the straight air pipe 96 and hence brake cylinder 89, in the same manner as during the first period. Under no circumstance, however, will brake cylinder pressure drop below 30 p.s.i., because at that value switch 91 will open and prevent further energization of release wire 20 even if wire 79 should become or still be energized.

Meanwhile, during this second period, switch 44′ will be controlled acording to train speed so as to be preconditioned to reflect existing train speed at the instant relay 23 drops out. It is to be noted, however, that if train speed drops below 6 miles per hour during this second period and thus causes relay 57 to become deenergized, the supply of current in bypass of switch 90 via wire 36, and front contact 70 and arm *c* of said relay, to wire 71 and arm *c* of relay 24 will be cut off and thus, if relay 24 is then deenergized, deenergize application wire 75 as well as release wire 20, for bottling up pressure fluid in straight air pipe 96 and hence in brake cylinder 89.

*Third period.—After relay 23 drops out*

When relay 23 drops out, current will flow via wire 36 and continuity transfer contacts *d, e* to wire 61 before arm *a* of said relay disengages said contact *d* and thus cuts off supply of current to wire 49; arm *b* will disengage front contact 29 for cutting off supply of current to wire 28 and hence rendering relay 22 completely ineffective, and arm *b* will engage back contact 38 for suppling current from wire 36 to arm *b* of relay 59; and arm *c* will engage back contact 35 for supplying current from wire 36 to wire 34. As at the commencement of the second period, supply of current to the holding circuit including wire 34 and arm *a* of relay 24 will be temporarily interrupted during drop out of relay 23 to assure that the relay 24 will be deenergized and controlled according to a new set of conditions.

Meanwhile, at the instant relay 23 drops out, relay 57 will be energized via switch 44′ and relay 59 deenergized if train speed then is at least 6 miles per hour; relay 59 will be energized via switch 44′ and relay 57 deenergized if train speed is then 4 miles per hour or less; and both of said relays will be deenergized if train speed is ideally between 6 and 4 miles per hour and causes switch 44′ to be disengaged from both contacts 46′ and 48′.

If relay 57 is then energized, it will be maintained energized during this third period because current will flow via continuity transfer contacts *d, e* of relay 23 to wire 61 (as above described) and thence via arm *a* and front contact 56 of relay 57 to the positive terminal of the latter via wire 58′. With relay 57 energized and relays 23, 59 deenergized, current will flow via back contact 38 of relay 23, arm *b* and back contact 67 of relay 59, and arm *b* and front contact 68 of relay 57 to wire 85 for energizing high rate contact HR of controller 27. Thus, the release relay 24 will remain deenergized for maintaining application train wire 75 and hence application device 92 energized via front contact 70 and arm *c* of relay 59, so long as the retardation rate is not sufficient to cause effective electrical contact of screw 80 with contact HR, because a greater degree of braking is desired in order to bring the train to a stop at the desired point within station B.

If, however, relay 57 is deenergized but relay 59 is energized at the instant relay 23 drops out, thus indicating that train speed is undesirably below or at 4 miles per hour, relay 59 will be maintained energized during and after drop out of relay 23 because current will flow via continuity transfer contacts *d, e*, of relay 23, wire 61, and arm *a* and front contact 58 to the positive terminal of relay 59 via wire 53' before supply of current to wire 53' from wire 49' is cut off. With relay 59 energized, current will flow via back contact 38 of relay 23 and arm *b* and front contact 66 of relay 59 to wire 83 for energizing low rate contact LR of controller 27. Thus, release relay 24 will be energized for energizing release wire 20 if the retardation rate is sufficient to cause screw 80 to contact the low rate contact LR. Since relay 57 is deenergized, current will be supplied via wire 36 to wire 71 only if switch 90 closes upon a drop in brake cylinder pressure to or below the illustrative 40 p.s.i.; hence, during this third period, application train wire 75 will not normally be energized when release relay 24 is deenergized.

If, on the other hand, relays 57, 59 are both deenergized at the instant relay 23 drops out, thus indicating that train speed is ideally between 6 and 4 miles per hour, both relays 57, 59 will remain deenergized because their holding circuits (including respective contacts 56, 58) will not be established. Hence, current will flow via back contacts 38, 67, 69 of relays 23, 59, 57, respectively, to wire 84 for energizing medium rate contact MR of controller 27. Hence, application wire 75 will not be energized, even if relay 24 is deenergized, unless switch 90 should close due to a drop in brake cylinder pressure to or below 40 p.s.i.; and release relay 24 will be energized only if the train retardation rate is sufficient to cause screw 80 to effectively contact medium rate contact MR.

As during the preceding period, if release relay 24 is energized during this period, it will be maintained energized via the holding circuit including back contact 35 of relay 23, wire 34, and arm *a* and contact *d* of relay 24. But as soon as the retardation rate of the train is reduced enough to cause screw 80 to effectively disengage the then energized contact HR, LR or MR, as the case may be, the supply of current to release wire 20 will be cut off for causing the devices 93, 92 to effectively bottle up pressure fluid in the brake cylinder 89, in the manner already described. As during the preceding period, brake cylinder pressure cannot drop below 30 p.s.i. because switch 91 will open and deenergize release wire 20 even if wire 79 should then be energized.

Thus, as a result of the train speed conditions sensed by the devices 25, 26 at commencement of the second and third periods, and as a result of the manner in which pressure of fluid in the straight air pipe 96 is controlled by the relays 22, 23, 24 and retardation controller 27 during the first, second and third period, the train 1 will be brought to a stop in station B within about 5 feet of a preselected point.

*Moving train out of station B*

After passengers or freight have been discharged and the train reloaded, radio-controlled switches 13, 37 on motor unit M will be opened to render the control system on said unit ineffective and the switches 13, 37 on motor unit M' will be closed by an appropriate change in frequency to render unit M' effective; and current at the 180 code rate will be supplied to track section Z instead of section X. The aforementioned propulsion controls not forming part of this invention will respond to this coded current in the rails 2, 3 of section Z to cause the train 1 to move rightward out of station B toward station A.

On motor unit M', relay 12 will be energized for deenergizing the application wire control circuits controlled by back contact 19, energizing the release wire 20 via front contact 18 and reenergizing time delay relays 22, 23 via front contact 17. With the application device 92 deenergized and release device 93 energized, the straight air pipe 96 will be cut off from supply pipe 95 and vented, for causing brake cylinder 89 to be vented so the train can proceed out of station B in the same manner as already described for operation through section Y. All components except possibly the devices 25, 26, 27 will be in the respective positions in which they are shown in FIG. 2, throughout movement through sections Z and Y; and as soon as the train enters the track section X, brakes will be applied and released, in the same manner as above described in connection with entry of motor unit M into track section Z, as necessary to bring the train to a stop at substantially a predetermined point within station A.

If at any time brake pipe pressure should drop to below the illustrative 35 p.s.i. (due to deenergization of device 111 responsively to failure of supply of electrical energy from source 16 or for any other reason), valve 105 will be shifted by spring 106 to emergency position to supply fluid at the pressure determined by reducing valve 110 to pipe 102 and thence via double check valve 100 to pipe 101 for causing valve 103 to provide in brake cylinder 89 fluid at the pressure provided in pipe 102 or straight air pipe 96 whichever is higher.

It is to be noted that while switch devices 86, 87 have been shown connected to branches of brake cylinder pipe 88, they may, if preferred, be connected to branches of straight air pipe 96 so that switch 91 will be closed when straight air pipe pressure exceeds 30 p.s.i. and switch 90 will be opened when straight air pipe pressure exceeds 40 p.s.i.

Having now described the invention, what I claim as new and desire to secure by Letters Patent is:

1. Apparatus for automatically controlling the brakes of a train after it reaches a predetermined point on a railway track so that the train will always stop within a predetermined zone at a preselected distance beyond said point, said apparatus comprising, in combination, braking means for the train, train-carried means conditioned upon the train reaching said point to initiate operation of said braking means, timing means set into operation upon the train reaching said point for thereafter measuring out certain time periods independently of movement of the train along the track, means controlled by train speed, means controlled by said timing means and speed-controlled means to select a desired degree of brake application for the train during at least some of the time periods according to how the actual train speed compares with an ideal train speed at the commencement of each such period, and means controlled by the last-introduced means to control operation of said braking means as necessary to maintain the brake application at such selected degree.

2. In an apparatus for automatically controlling the brakes of a train after it reaches a predetermined point on a railway track so that the train will always stop within a predetermined zone at a preselected distance beyond said point, the combination of: train-carried means conditioned upon the train reaching said point to initiate an application of train brakes, timing means set into operation upon the train reaching said point for thereafter measuring out certain time periods independently of movement of the train along the track, means controlled by train speed, means controlled by said timing means and speed-controlled means to select a desired rate of deceleration for the train during at least some of the time periods according to how the actual train speed compares with an ideal train speed at the commencement of each such period, and means controlled by the last-introduced means to adjust the degree of brake application as necessary to maintain deceleration at substantially said desired rate.

3. In a brake apparatus for a vehicle, the combination of application means and release means operable for respectively causing an application and a release of vehicle brakes, control means having one position for causing operation of said release means and another position for normally causing operation of said application means, a quick release relay interposed between said control means and application means and normally positioned for permitting operation of said application means and operable to another position for preventing operation of said application means and causing operation of said release means independently of said control means, means including means controlled responsively to the retardation of the vehicle for actuating said relay to said other position if retardation exceeds a preselected rate and preventing such independent operation of said release means upon a reduction in retardation to below said preselected rate, switch means controlled by vehicle speed, relay means controlled by the switch means for preselecting said preselected rate in accordance with vehicle speed existing at the end of a certain time period, and means including timing means conditioned upon movement of said control means to its other position to thereafter determine the length of such time period independently of movement of the train along the track.

4. The combination according to claim 3, wherein the vehicle is a railway vehicle movable over rails divided into a plurality of electrically isolated track sections in which various coded currents are imposed, and including an electrical circuit comprising inductor means responsive to coded current conditions in the rails of the particular track section in which the vehicle is disposed to control positoning of said control means.

5. In a brake apparatus for a vehicle, the combination of an application wire and a release wire selectively energizable for respectively causing an application and a release of vehicle brakes and concurrently deenergized for retaining an existing degree of brake application, a first electrical circuit via which current may flow to the application wire, control means having one position and another position for selectively supplying current to the release wire and to the circuit respectively from a source of electrical energy, first and second time delay relay means energized by said control means in said one position and adapted to be deenergized a preselected time interval and a preselected greater time interval respectively after said control means is operated to its other position independently of movement of the vehicle, an electrical switch for each relay means controlled by vehicle speed, a pair of relays controlled by each switch, means controlled responsively to the retardation of the vehicle and having low rate, medium rate and high rate electrical contacts and an inertia-controlled member effectively engageable with a selective one of said contacts according to the rate of deceleration of the vehicle, a second electrical circuit established by said control means in its other position and by said second and first relay means until said first relay means is deenergized for energizing the medium rate contact, other electrical circuits selectively established by said control means in its other position and said second and first relay means and at least one of said pair of relays associated with said first relay means upon deenergization of the latter for energizing the high rate, medium rate or low rate contact according to whether vehicle speed as measured by the corresponding switch exceeds or is substantially at or is less than a preselected value at the instant said first relay means becomes deenergized, different electrical circuits selectively established by said control means in its other position and said second relay means and at least one of said pair of relays associated with said second relay means upon deenergization of the latter for energizing the high rate, medium rate or low rate contact according to whether vehicle speed as measured by the corresponding switch exceeds, is substantially at or is less than a preselected lower value at the instant said second relay means becomes deenergized, other electrically-controlled means normally electrically connected to said member and normally deenergized to permit current flow through said first circuit to said application wire and energizable responsively to energization of said member from one of said contacts to open said first circuit to prevent current flow to the application wire and establish a bypass circuit including said member via which current may flow to the release wire in bypass of the control means provided and so long as said member is energized from one of said contacts, and circuit means including a holding circuit controlled by said control means and first and second relay means and via which said other means when energized will be maintained energized, supply of current to said holding circuit being established by said control means in its said other position and temporarily interrupted by and upon deenergization of said first relay means and by and upon deenergization of said second relay means.

6. The combination according to claim 5, wherein the vehicle is a railway vehicle movable over rails divided into a plurality of electrically isolated track sections in which various coded currents are imposed, and including an electrical circuit comprising inductor means responsive to the coded current condition in the rails of the particular track section in which the vehicle is disposed to control positioning of said control means.

7. The combination according to claim 5, including switch means controlled by the degree of brake application and controlling connection of said member with said other means and bypass circuit and operative to disestablish such connection when the brake application is less than a preselected minimum degree.

8. The combination according to claim 5, wherein said first circuit comprises two branches arranged in parallel between said control means and other means, and a certain one of the relays associated with said second relay means is interposed in one of said branches and positioned to permit current flow through said one branch while vehicle speed exceeds said preselected lower value, and including a switch controlled by degree of brake application interposed in the other of said branches and opened to prevent current flow through said other branch in bypass of said certain relay when brakes are applied in excess of a certain degree.

9. The combination according to claim 5, including electrically controlled means normally energized from the source and deenergized responsively to failure of the course to cause an application of brakes.

10. The combination according to claim 5, including a straight air pipe, an application magnet valve responsive to energization of said application wire to supply pressure fluid to the straight air pipe, a release magnet valve responsive to energization of said release wire to release pressure fluid from the straight air pipe, a normally charged brake pipe, electrically controlled means normally energized from the source and responsive to failure of the source to release pressure fluid from the brake pipe, an emergency application valve subject to brake pipe pressure and a bias pressure and operative to vent or to supply pressure fluid to another pipe according to whether the brake pipe is charged or vented, a brake controlling communication to which pressure fluid is supplied for causing an application of brakes and from which pressure fluid is released for causing a release of brakes, and a double check valve for connecting said communication to said straight air pipe or other pipe according to which of these latter pipes is charged to the higher pressure.

11. In a brake apparatus for a vehicle, the combination of electrically controlled application means and release means operable for respectively causing an application and a release of vehicle brakes, control means having one position for causing operation of said release means and another position for normally causing operation of said application means, means controlled responsively to the retardation of the vehicle and including a plurality of electrical contacts and an inertia-controlled member effectively engageable with a selective one of said contacts according to the rate of retardation of the vehicle, means including means controlled by vehicle speed for selectively energizing a corresponding one of said contacts according to vehicle speed, and other means normally electrically connected to said member and interposed between said control means and application means, said other means being normally deenergized to permit operation of said application means under control of said control means and energizable to prevent such operation of said application means and cause operation of said release means independently of said control means so long as said member is energized from one of said contacts, thereby to cause termination of such independent operation of said release means when retardation rate reduces sufficiently to effectively disengage said member from the then energized one of said contacts.

12. In a brake apparatus for a vehicle, the combination of electrically controlled means responsive to energization of an application wire to cause an application of vehicle brakes, electrically controlled means responsive to energization of a release wire to cause a release of vehicle brakes, a retardation controller having a plurality of electrical contacts and an inertia-controlled member effectively engageable with a selective one of said contacts according to the rate of deceleration of the vehicle, means including means controlled by vehicle speed for selectively energizing a corresponding one of said contacts according to vehicle speed, and other electrically controlled means normally electrically connected to said member and normally deenergized to permit current flow to the application wire and prevent current flow to the release wire and energized responsively to energization of said member to prevent current flow to said application wire and permit current flow to said release wire via a circuit including said member so long as said member is energized via the then energized one of said contacts.

13. The combination according to claim 12, wherein means including a holding circuit is provided for maintaining said other means energized once it is energized, thereby to prevent current flow to the application wire and cause current flow to the release wire only when said member is energized from an energized one of said contacts.

14. In a brake apparatus for a vehicle, the combination of electrically controlled application means and release means operable for respectively causing an application and a release of vehicle brakes, control means having one position for causing operation of said release means and another position for normally causing operation of said application means, other electrically controlled means interposed between said control means and application means and normally deenergized to permit operation of said application means, means controlled responsively to retardation of the vehicle and including a plurality of electrical contacts and an inertia-controlled member effectively engageable with a selective one of said contacts according to the rate of retardation of the vehicle, means electrically connecting said member and other means for energizing the latter when said member effectively engages an energized one of said contacts, said other means when energized operating to prevent operation of said application means and establish a connection for effecting operation of said release means independently of said control means, means responsive to deenergization of said member to disestablish said connection, switch means controlled by vehicle speed, relay means controlled by the switch means for preselecting which one of said contacts is to be energized at the expiry of a preselected time period, and means including time delay means conditioned upon movement of said control means to its other position to determine the length of said time period and energize said preselected one of said contacts at the expiry thereof.

15. In a brake apparatus for a vehicle, control means normally positioned to effect a release of brakes and operable to another position to cause an application of brakes, means controlled responsively to retardation of the vehicle and including low rate, medium rate and high rate electrical contacts and an inertia-controlled member effectively selectively engageable with said contacts accordingly as deceleration rate increases, timing means rendered operative upon operation of said control means to its other position to initially energize said medium rate contact and then after a certain period of time move to another position, switch means controlled by vehicle speed, relay means initially positioned by said switch means and maintained in such position by and upon movement of the timing means to its other position to cause said timing means and relay means cooperatively to effect energization of the high rate, medium rate or low rate contact according to whether train speed as sensed by said switch means respectively exceeds, is substantially at or is less than a preselected value at the instant said timing means moves to its other position, and electrically controlled means normally electrically connected to said member and normally deenergized and energized responsively to energization of said member to interrupt the application of brakes being caused by said control means and effect a release of brakes independently of said control means so long as said member remains energized via the then energized one of said contacts.

16. The combination according to claim 15, wherein means including a holding circuit is provided for maintaining said electrically controlled means energized once it is energized via said member, thereby to maintain the application of brakes interrupted and to effect such independent release of brakes only while said member is energized by engagement with the then energized one of said contacts.

17. Fluid pressure vehicle brake control apparatus having application and release magnet valves for controlling a brake control fluid pressure, characterized by the combination of:
(a) a source of electrical energy,
(b) control means for initiating a brake application,
(c) time controlled relay means having a plurality of different positions established at progressive time intervals following initiation of a brake application,
(d) speed controlled relay means having a plurality of different electrical conditions established responsively to different vehicle speeds following initiation of a brake application,
(e) retardation controller means having a plurality of contact members selectively supplied with an electrical potential from said source for performing a regulating function at different rates of vehicle retardation,
(f) electro-responsive control means operative to selectively render the application and release magnet valves effective to increase, decrease, or maintain a brake control fluid pressure for regulating the degree of a brake application,
(g) said speed controlled relay means and said time controlled relay means cooperatively establishing different circuitry for selectively supplying electrical potential from said source to said contact members of said retardation controller means at spaced intervals of time after initiation of a brake application and in accordance with different vehicle speeds, and
(h) said retardation controller means being operatively responsively to the retardation of the vehicle, according to the one of said contact members thereof supplied with electrical potential, to selectively operate said electro-responsive control means to cause said application and release magnet valves to control the brake control fluid pressure so as to regulate the degree of vehicle braking to provide a corresponding rate of retardation.

(References on following page)

References Cited by the Examiner

UNITED STATES PATENTS

| | | | |
|---|---|---|---|
| 1,826,492 | 10/31 | Babson | 246—182 |
| 1,827,407 | 10/31 | Simmen | 246—182 |
| 2,127,429 | 8/38 | Schoepf et al. | |
| 2,312,050 | 2/43 | Place | 246—63 |
| 2,317,134 | 4/43 | McCune | 303—21 X |
| 2,510,066 | 6/50 | Busignies | 246—8 |
| 2,535,162 | 12/50 | Rodgers | 246—63 |
| 2,605,334 | 7/52 | Hines. | |
| 2,623,990 | 12/52 | Key | 246—63 |
| 2,641,688 | 6/63 | Adams | 246—63 |
| 2,761,962 | 9/56 | Hughson et al. | 246—63 |
| 2,915,623 | 12/59 | Hughson | 246—63 |
| 2,951,452 | 9/60 | Karlet | 104—26 |
| 3,041,449 | 6/62 | Bingen | 246—63 X |
| 3,049,381 | 8/62 | Zeigler | 303—21 |

LEO QUACKENBUSH, *Primary Examiner.*

JAMES S. SHANK, *Examiner.*